United States Patent
Relyea

(10) Patent No.: US 7,992,203 B2
(45) Date of Patent: Aug. 2, 2011

(54) METHODS AND SYSTEMS FOR SECURE SHARED SMARTCARD ACCESS

(75) Inventor: Robert Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1093 days.

(21) Appl. No.: 11/439,175

(22) Filed: May 24, 2006

(65) Prior Publication Data

US 2007/0277032 A1 Nov. 29, 2007

(51) Int. Cl.
*G06F 21/00* (2006.01)
*G06F 3/00* (2006.01)
*G06F 9/44* (2006.01)
*G06F 9/46* (2006.01)
*G06F 13/00* (2006.01)

(52) U.S. Cl. .......................... 726/20; 713/185; 719/321
(58) Field of Classification Search ................ 726/9, 20; 713/185; 719/321
See application file for complete search history.

(56) References Cited

U.S. PATENT DOCUMENTS

| | | |
|---|---|---|
| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |
| 5,666,415 A | 9/1997 | Kaufman |
| 5,721,781 A | 2/1998 | Deo et al. |
| 5,745,576 A | 4/1998 | Abraham et al. |
| 5,745,678 A | 4/1998 | Herzberg et al. |
| 5,768,373 A | 6/1998 | Lohstroh et al. |
| 5,862,310 A | 1/1999 | Crawford et al. |
| 5,923,884 A * | 7/1999 | Peyret et al. .................. 717/167 |
| 5,937,006 A | 8/1999 | Gennaro et al. |
| 5,943,423 A | 8/1999 | Muftic |
| 5,991,411 A | 11/1999 | Kaufman et al. |
| 5,991,882 A | 11/1999 | O'Connell |
| 6,005,942 A | 12/1999 | Chan et al. |
| 6,005,945 A | 12/1999 | Whitehouse |
| 6,011,847 A | 1/2000 | Follendore, III |
| 6,016,476 A | 1/2000 | Maes et al. |
| 6,044,155 A | 3/2000 | Thomlinson et al. |
| 6,072,876 A | 6/2000 | Obata et al. |

(Continued)

FOREIGN PATENT DOCUMENTS

WO 9724831 7/1997

(Continued)

OTHER PUBLICATIONS

ATM and Credit Card Notification, Feb. 2005 (internet archive) pp. 1-2, www.thereareplaces.com/infgdes/money.atmnotif.htm.

(Continued)

*Primary Examiner* — Christian LaForgia
(74) *Attorney, Agent, or Firm* — MH2 Technology Law Group LLP

(57) ABSTRACT

An embodiment generally relates to a method of accessing a secure computer. The method includes capturing an authentication state of a security token in response to a verification of user authentication information. The method also includes providing the authentication state to at least one application requiring authentication with the security token and accessing the at least one application.

22 Claims, 6 Drawing Sheets

U.S. PATENT DOCUMENTS

| | | | |
|---|---|---|---|
| 6,141,420 | A | 10/2000 | Vanstone et al. |
| 6,178,507 | B1 | 1/2001 | Vanstone |
| 6,179,205 | B1 | 1/2001 | Sloan |
| 6,226,744 | B1 | 5/2001 | Murphy et al. |
| 6,377,825 | B1 | 4/2002 | Kennedy et al. |
| 6,490,680 | B1 | 12/2002 | Scheidt et al. |
| 6,502,108 | B1 | 12/2002 | Day et al. |
| 6,539,093 | B1 | 3/2003 | Asad et al. |
| 6,636,975 | B1 | 10/2003 | Khidekel et al. |
| 6,643,701 | B1 | 11/2003 | Aziz et al. |
| 6,687,190 | B2 * | 2/2004 | Momich et al. ............... 368/10 |
| 6,691,137 | B1 | 2/2004 | Kishi |
| 6,698,654 | B1 | 3/2004 | Zuppicich |
| 6,734,886 | B1 | 5/2004 | Hagan et al. |
| 6,760,752 | B1 | 7/2004 | Liu et al. |
| 6,804,687 | B2 | 10/2004 | Sampson |
| 6,819,766 | B1 | 11/2004 | Weidong |
| 6,826,686 | B1 | 11/2004 | Peyravian |
| 6,829,712 | B1 | 12/2004 | Madoukh |
| 6,880,037 | B2 | 4/2005 | Boyer |
| 6,880,084 | B1 | 4/2005 | Brittenham et al. |
| 6,898,605 | B2 | 5/2005 | Constantino |
| 6,898,714 | B1 | 5/2005 | Nadalin et al. |
| 6,931,133 | B2 | 8/2005 | Andrews et al. |
| 6,941,326 | B2 | 9/2005 | Kadyk et al. |
| 6,970,970 | B2 | 11/2005 | Jung et al. |
| 6,978,933 | B2 * | 12/2005 | Yap et al. ............... 235/451 |
| 6,986,040 | B1 | 1/2006 | Kramer et al. |
| 7,007,105 | B1 | 2/2006 | Sullivan et al. |
| 7,010,600 | B1 | 3/2006 | Prasad et al. |
| 7,050,589 | B2 | 5/2006 | Kwan |
| 7,051,213 | B1 | 5/2006 | Kobayashi et al. |
| 7,085,386 | B2 | 8/2006 | Audebert et al. |
| 7,114,028 | B1 | 9/2006 | Green et al. |
| 7,156,302 | B2 * | 1/2007 | Yap et al. ............... 235/382 |
| 7,159,763 | B2 * | 1/2007 | Yap et al. ............... 235/375 |
| 7,185,018 | B2 | 2/2007 | Archbold et al. |
| 7,251,728 | B2 | 7/2007 | Toh et al. |
| 7,278,581 | B2 | 10/2007 | Ong |
| 7,299,364 | B2 * | 11/2007 | Noble et al. ............... 713/189 |
| 7,302,585 | B1 | 11/2007 | Proudler et al. |
| 7,356,688 | B1 | 4/2008 | Wang |
| 7,374,099 | B2 * | 5/2008 | de Jong ............... 235/492 |
| 7,386,705 | B2 | 6/2008 | Low et al. |
| 7,437,757 | B2 | 10/2008 | Holdsworth |
| 7,451,921 | B2 * | 11/2008 | Dowling et al. ............... 235/380 |
| 7,475,250 | B2 | 1/2009 | Aull et al. |
| 7,475,256 | B2 | 1/2009 | Cook |
| 7,480,384 | B2 | 1/2009 | Peyravian et al. |
| 7,502,793 | B2 | 3/2009 | Snible et al. |
| 7,571,321 | B2 | 8/2009 | Appenzeller et al. |
| 7,602,910 | B2 | 10/2009 | Johansson et al. |
| 7,702,917 | B2 | 4/2010 | Tevosyan et al. |
| 7,769,996 | B2 | 8/2010 | Randle et al. |
| 7,822,209 | B2 | 10/2010 | Fu et al. |
| 7,860,243 | B2 | 12/2010 | Zheng et al. |
| 2001/0008012 | A1 | 7/2001 | Kausik |
| 2001/0036276 | A1 | 11/2001 | Ober et al. |
| 2001/0054148 | A1 | 12/2001 | Hoornaert et al. |
| 2002/0004816 | A1 | 1/2002 | Vange et al. |
| 2002/0007351 | A1 | 1/2002 | Hillegass et al. |
| 2002/0007359 | A1 | 1/2002 | Nguyen |
| 2002/0010679 | A1 | 1/2002 | Felsher |
| 2002/0029343 | A1 * | 3/2002 | Kurita ............... 713/185 |
| 2002/0056044 | A1 * | 5/2002 | Andersson ............... 713/189 |
| 2002/0059144 | A1 | 5/2002 | Meffert et al. |
| 2002/0064095 | A1 * | 5/2002 | Momich et al. ............... 368/10 |
| 2002/0080958 | A1 | 6/2002 | Ober et al. |
| 2002/0099727 | A1 | 7/2002 | Kadyk et al. |
| 2002/0112156 | A1 | 8/2002 | Gien et al. |
| 2002/0120842 | A1 | 8/2002 | Bragstad et al. |
| 2002/0133707 | A1 | 9/2002 | Newcombe |
| 2002/0171546 | A1 | 11/2002 | Evans et al. |
| 2002/0184149 | A1 | 12/2002 | Jones |
| 2002/0188848 | A1 | 12/2002 | Buttiker |
| 2003/0005291 | A1 | 1/2003 | Burn |
| 2003/0012386 | A1 | 1/2003 | Kim et al. |
| 2003/0028664 | A1 | 2/2003 | Tan et al. |
| 2003/0035548 | A1 | 2/2003 | Kwan |
| 2003/0056099 | A1 | 3/2003 | Asanoma et al. |
| 2003/0075610 | A1 | 4/2003 | Ong |
| 2003/0093695 | A1 | 5/2003 | Dutta |
| 2003/0115455 | A1 | 6/2003 | Aull et al. |
| 2003/0115466 | A1 | 6/2003 | Aull et al. |
| 2003/0115467 | A1 | 6/2003 | Aull et al. |
| 2003/0115468 | A1 | 6/2003 | Aull et al. |
| 2003/0167399 | A1 | 9/2003 | Audebert et al. |
| 2003/0172034 | A1 | 9/2003 | Schneck et al. |
| 2004/0042620 | A1 | 3/2004 | Andrews et al. |
| 2004/0053642 | A1 | 3/2004 | Sandberg et al. |
| 2004/0066274 | A1 | 4/2004 | Bailey |
| 2004/0088562 | A1 * | 5/2004 | Vassilev et al. ............... 713/200 |
| 2004/0096055 | A1 | 5/2004 | Williams et al. |
| 2004/0103324 | A1 | 5/2004 | Band |
| 2004/0103325 | A1 | 5/2004 | Priebatsch |
| 2004/0120525 | A1 | 6/2004 | Miskimmin et al. |
| 2004/0144840 | A1 | 7/2004 | Lee et al. |
| 2004/0146163 | A1 | 7/2004 | Asokan et al. |
| 2004/0153451 | A1 | 8/2004 | Phillips et al. |
| 2004/0162786 | A1 | 8/2004 | Cross et al. |
| 2004/0230831 | A1 | 11/2004 | Spelman et al. |
| 2005/0022123 | A1 | 1/2005 | Constantino |
| 2005/0033703 | A1 | 2/2005 | Holdsworth |
| 2005/0109841 | A1 | 5/2005 | Ryan et al. |
| 2005/0114673 | A1 | 5/2005 | Raikar et al. |
| 2005/0119978 | A1 | 6/2005 | Ates |
| 2005/0123142 | A1 | 6/2005 | Freeman et al. |
| 2005/0136390 | A1 | 6/2005 | Adams et al. |
| 2005/0138386 | A1 | 6/2005 | Le Saint |
| 2005/0144312 | A1 | 6/2005 | Kadyk et al. |
| 2005/0184163 | A1 * | 8/2005 | de Jong ............... 235/492 |
| 2005/0184164 | A1 * | 8/2005 | de Jong ............... 235/492 |
| 2005/0184165 | A1 | 8/2005 | de Jong |
| 2005/0188360 | A1 * | 8/2005 | de Jong ............... 717/136 |
| 2005/0216732 | A1 | 9/2005 | Kipnis et al. |
| 2005/0262361 | A1 | 11/2005 | Thibadeau |
| 2005/0279827 | A1 | 12/2005 | Mascavage et al. |
| 2005/0289652 | A1 | 12/2005 | Sharma et al. |
| 2006/0005028 | A1 | 1/2006 | Labaton |
| 2006/0010325 | A1 | 1/2006 | Liu et al. |
| 2006/0015933 | A1 | 1/2006 | Ballinger et al. |
| 2006/0036868 | A1 | 2/2006 | Cicchitto |
| 2006/0043164 | A1 * | 3/2006 | Dowling et al. ............... 235/375 |
| 2006/0072747 | A1 | 4/2006 | Wood et al. |
| 2006/0073812 | A1 | 4/2006 | Punaganti Venkata et al. |
| 2006/0075133 | A1 | 4/2006 | Kakivaya et al. |
| 2006/0075486 | A1 | 4/2006 | Lin et al. |
| 2006/0101111 | A1 | 5/2006 | Bouse et al. |
| 2006/0101506 | A1 | 5/2006 | Gallo et al. |
| 2006/0173848 | A1 | 8/2006 | Peterson et al. |
| 2006/0174104 | A1 | 8/2006 | Crichton et al. |
| 2006/0206932 | A1 | 9/2006 | Chong |
| 2006/0208066 | A1 | 9/2006 | Finn et al. |
| 2006/0226243 | A1 | 10/2006 | Dariel |
| 2006/0291664 | A1 | 12/2006 | Suarez et al. |
| 2006/0294583 | A1 | 12/2006 | Cowburn et al. |
| 2007/0014416 | A1 | 1/2007 | Rivera et al. |
| 2007/0074034 | A1 | 3/2007 | Adams et al. |
| 2007/0112721 | A1 | 5/2007 | Archbold et al. |
| 2007/0113267 | A1 | 5/2007 | Iwanski et al. |
| 2007/0113271 | A1 | 5/2007 | Pleunis |
| 2007/0118891 | A1 | 5/2007 | Buer |
| 2007/0162967 | A1 | 7/2007 | de Jong et al. |
| 2007/0169084 | A1 | 7/2007 | Frank et al. |
| 2007/0189534 | A1 | 8/2007 | Wood et al. |
| 2007/0204333 | A1 | 8/2007 | Lear et al. |
| 2007/0230706 | A1 | 10/2007 | Youn |
| 2007/0271601 | A1 | 11/2007 | Pomerantz |
| 2007/0280483 | A1 | 12/2007 | Fu |
| 2007/0282881 | A1 | 12/2007 | Relyea |
| 2007/0283163 | A1 | 12/2007 | Relyea |
| 2007/0283427 | A1 | 12/2007 | Gupta et al. |
| 2007/0288745 | A1 | 12/2007 | Kwan |
| 2007/0288747 | A1 | 12/2007 | Kwan |

| | | |
|---|---|---|
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |

FOREIGN PATENT DOCUMENTS

| | | |
|---|---|---|
| WO | 0048064 A1 | 3/2000 |
| WO | 2007096590 A1 | 8/2007 |

OTHER PUBLICATIONS

AMD Announces Specification for Open Platform Management Architecture, Feb. 28, 2005, pp. 1-2, http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Source Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS#11 v2.20: Cryptographic Token Interface Standard, RSA Laboratories, Jun. 28, 2004 (see, e.g. Chapter 10, Objects) (see www.rsasecurity.com, 407 pages).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

Schneier, Bruce. Applied Cryptography, Second Edition. 1996 John Wiley and Sons, pp. 480-481.

* cited by examiner

US 7,992,203 B2

METHODS AND SYSTEMS FOR SECURE SHARED SMARTCARD ACCESS

FIELD

This invention generally relates to secure client-server systems. More particularly, the invention relates to a method and system secure shared smartcard access to a secure client.

DESCRIPTION OF THE RELATED ART

Computer security is a field of computer science concerned with the control of risks related to use of computer systems. In computer security, authentication is a process of determining whether a computer, a software application, or a user is, in fact, what or who it is declared to be.

An example of user authentication is a user credential, such as a user name and password. Requirements for user credentials may be different among multiple software applications, which complicate a user's access to multiple software applications during the same work session. For example, healthcare workers may use healthcare-related applications, such as clinical results reporting, physician order entry, and chart completion, and may use general-purpose software applications, such as e-mail, time and attendance, accounting, human resources self-service, and incident reporting.

Single sign-on (SSO) is a specialized form of software authentication that enables a computer, a computer program, or a user to authenticate once, and gain access to multiple software applications and/or multiple computer systems. For example, in a client/server environment, SSO is a session/user authentication process that permits a user to present one set of credentials at one time in order to access multiple software applications. The SSO credentials, which is requested at the initiation of the session, authenticates the user to access the software applications on the server that have been given access rights, and eliminates future authentication prompts when the user switches between software applications during a particular session. Examples of SSO or reduced signon systems include: enterprise single sign-on (E-SSO), web single sign-on (Web-SSO), Kerberos, and others.

E-SSO, also called legacy single sign-on, after primary user authentication, intercepts log-on prompts presented by secondary applications, and automatically fills in fields such as a log-on ID or password. E-SSO systems allow for interoperability with software applications that are unable to externalize user authentication, essentially through "screen scraping." However, E-SSO requires cooperation among computers in the enterprise, and is sometimes referred to as enterprise reduced sign-on.

Although E-SSO is a solution in enterprises that have a single type of authentication scheme, primarily the ID/password. However, secure enterprise systems typically have multiple log-in systems such as a trusted patch authenticated smart card or a biometric based log-in system. The E-SSO solution cannot operate in these multiple log-in systems because the E-SSO solution has no direct access to the authentication information.

In some instances, a user may log-on to a secure machine with a smart card in the secure multi-user environment. A problem may arise if a second user logs into the secure machine with the first user's smart card inserted. One goal would be to prevent the second user from pretending to be the first user and causing havoc. However, this has to be balanced with the burden of requiring a user to enter a personal identification number to access each application in a session. The issue then becomes how to authenticate to a smart card once as a user and allow other people to use the smart card for other operations. More generally, how to share a log-in state with trusted applications.

SUMMARY

An embodiment generally relates to a method of accessing a secure computer. The method includes capturing an authentication state of a security token in response to a verification of user authentication information. The method also includes using the authentication state to provide authenticated services for the at least one application requiring authentication with the security token and accessing the at least one application.

Another embodiment generally pertains to a system for secure access. The system includes a computing machine configured to access a multi-user multi-machine system and a security device interface with the computing machine. The security device is configured to accept a security token for accessing the computing machine. The system also includes a security daemon configured to be executing on the computing machine. The security daemon is configured to initiate a session and capture an authentication state of a security token in response to a verification of user inputted authentication information. The security daemon may also bind the authentication state to the session.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

Figure 1:
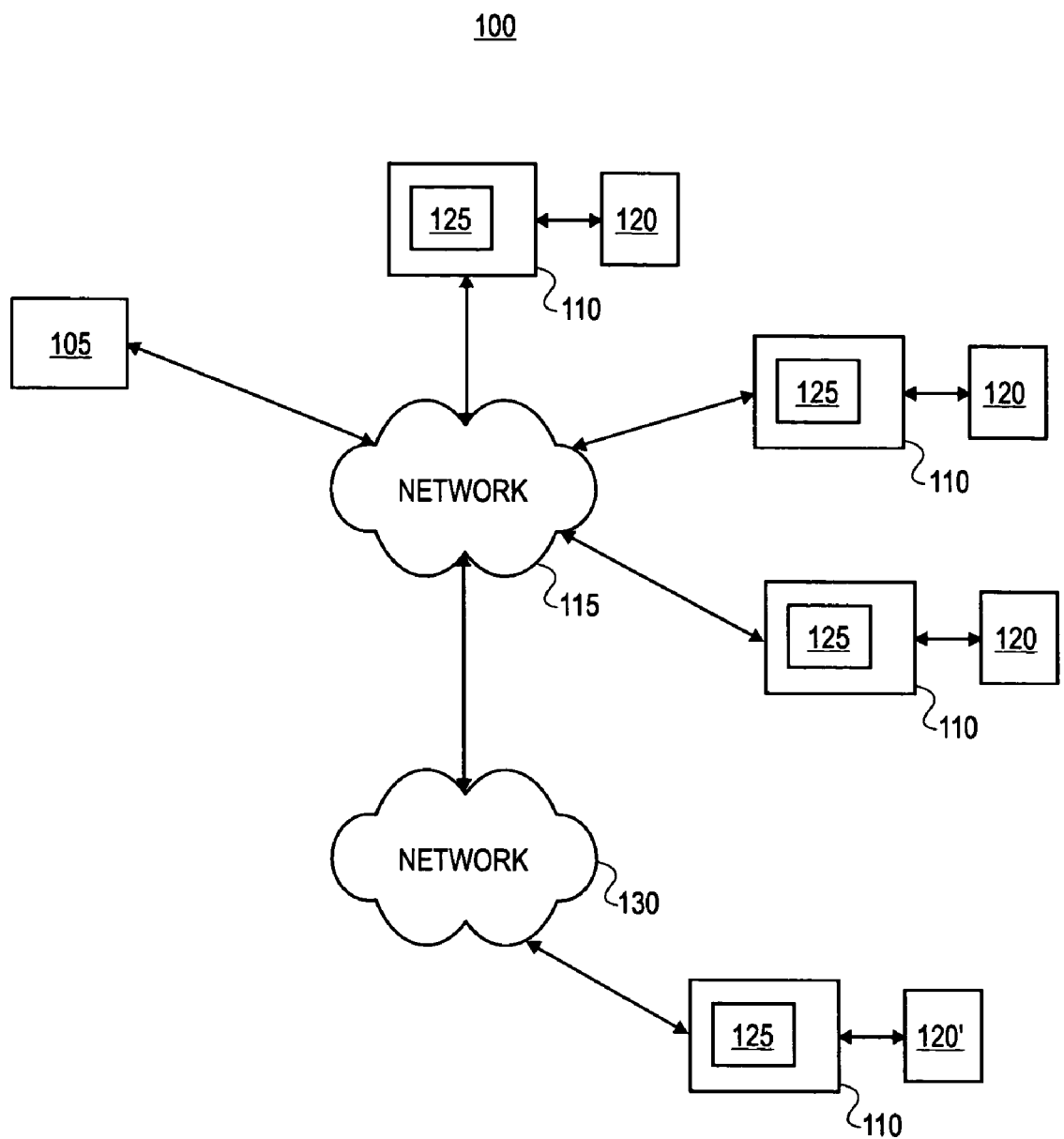
FIG. 1 illustrates an exemplary system 100 in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of secure distributed environments and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments pertain generally to a method of sharing a security token among applications within a session. More particularly, a user may insert a security token, such as a smart card, into a secure computing machine and begin logging into the secure machine. An application may detect the presence of the inserted smart card and prompt the user to begin the log-on process. The user may authenticate to the security daemon, which then authenticate to the security token with the user entered authentication information. The security daemon may be configured to capture the authentication state and represent the authenticated security token to other applications in the session. In other words, the security daemon would log into the token, keep the token logged in and then use the fact that it has the token opened and logged in to perform operations on behalf of the user. As a result, the security daemon appears to the rest of the processes in the session that the security token is inserted through a Public Key Cryptography Standard (PKCS) #11 interface. Applications that require authentication may query the security daemon for authentication using the same PKCS #11 calls as they do in conventional smart card systems. Moreover, the security daemon may "own" the representation of the security token being inserted, i.e., the authentication state, by locking access to the card. As a result, other processes and/or applications cannot co-opt the authentication state in tokens that do not hold separate authentication states for different processes such as those defined in the PIV standards.

Other embodiments relate to accessing remote computers. More specifically, the security daemon provides a mechanism for secure shell (ssh) access to remote computing machines. More particularly, a local machine may securely connect to the remote machine using ssh protocols. The ssh application may advertise a PKCS #11 port that receives PKCS #11 calls on the remote client. During the authentication process, the remote computer may pass queries for authentication through the advertised port over the secured connection between the local and remote machines. The queries are directed to the security daemon, which presents the authentication state to the remote machine. After authentication, a user has access to the resources on the remote computer as though the user was physically logged-on in at the remote computer.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute secure and unsecure (or open) applications through a multiple user operating system (not shown) in conjunction with the clients 110. The server 105 may be implemented with server platforms as known to those skilled in the art from Intel, Advanced Micro Devices, Hewlett-Packard, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 may be computing machine or platform (machine) configured to execute secure and open applications through the multi-user operating system. The clients 110 may be implemented with personal computers, workstations, thin clients, thick clients, or other similar computing platform.

Each client 110 may be configured to interface with a security device 120. The security device 120 may be configured to act as a gatekeeper to the client 110. More particularly, a user may use a security token, such as a smart card, to access the respective client 110. Each client 110 may have a security daemon 125 executing to monitor the security device 120, which is illustrated in FIG. 2.

Figure 2:
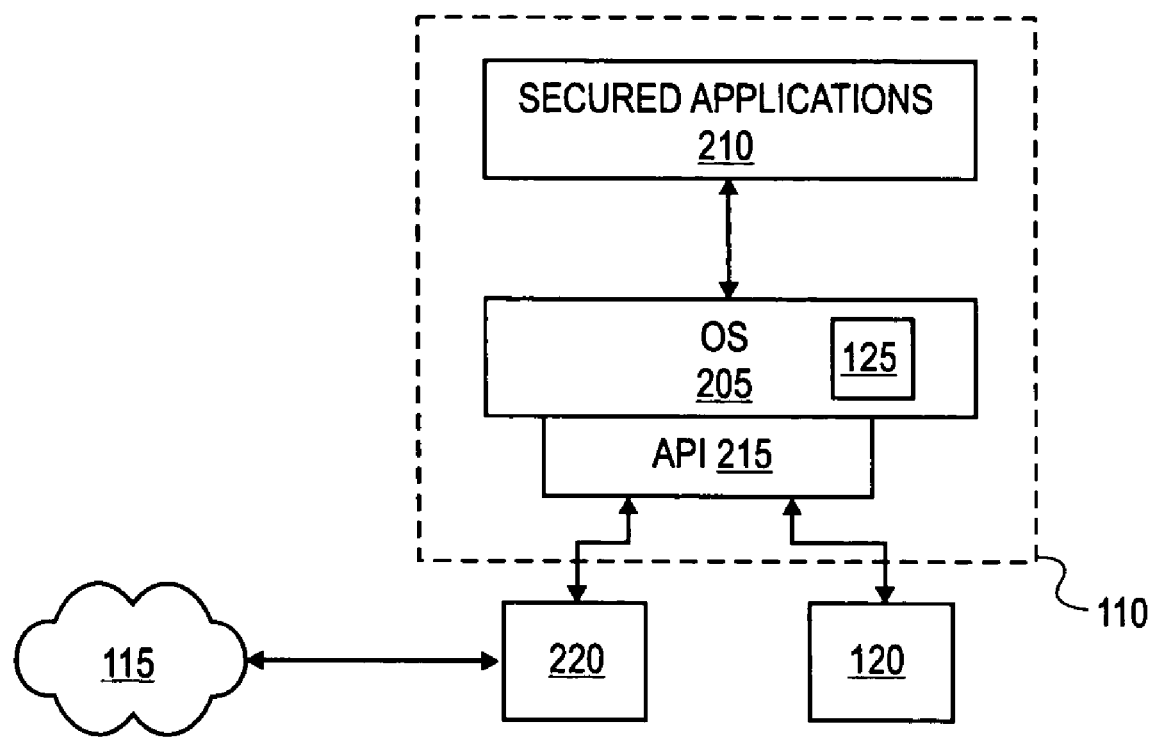
FIG. 2 illustrates an architectural diagram of the computing machine in accordance with another embodiment.

As shown in FIG. 2, a client 110 may be executing a multi-user operating system (OS) 205. The OS may be Linux, HPUX, or other similar operating systems. The security daemon 125 executes within the OS 205. The OS 205 may also interface with the secured applications 210 as well as unsecured applications (not shown). Secure application 210 may any type of software that requires authentication from the smart card to initialize and execute.

The OS 205 may also interface with an application program interface (labeled as API in FIG. 2) 215. The API 215 provides an interface between devices and the OS 205 transmitting and receiving data and commands therebetween. FIG. 2 shows the security device 120 and a network interface 220 interfaced with the API 215. The network interface 220 may also be configured to interface with local network 115. A client may use the network interface 220 to initiate secure shell (SSH) protocols to form a secure connection with remote computers from the client 110. SSH applications are well-known to those skilled in the art.

Returning to FIG. 1, the security daemon 125 may be configured to detect the presence of the inserted security token and prompt the user to begin the log-on process. The user may authenticate to the security daemon 125, which then authenticates to the security token with the user entered authentication information. The security daemon 125 may be configured to capture the authentication state and represent the authenticated security token to other applications in the session. The security daemon 125 may also be configured to interface with other processes and/or applications in the session with a PKCS #11 interface. PKCS #11 is a cryptographic token interface standard known to those skilled in the art.

The secure system 100 may also comprise a second network 130 that may be interfaced with local network 115. A remote client 110' may be connected with the second network 130. The remote client 110' may be similar to client 110 with a security device 120'. The security device 120' may also function as a gatekeeper to the remote client 110'. Accordingly, a user may remote login to the remote client 110' from one of the client 110 using secure shell (ssh) protocols. SSH protocols are well-known to those skilled in the art. During the remote log-in, the client 110 may create a secure connection using ssh protocols to connect with the remote client 110'. The ssh application may be configured to publish the PKCS #11 port of the client computer 110 to the remote client 110'. The remote client 110' may forward authentication queries through the PKCS #11 port over the secure connection to the client 110. The security daemon 125 on the client 110 presents its authentication state to answer the authentication queries of the remote client 110'. Since the user of client 110 is a valid user, the remote client 110' may grant access to the client 110 as though the user was logged on at the remote client 110'. This process may also be used to remote access client 110 from another client 110.

Figure 3:
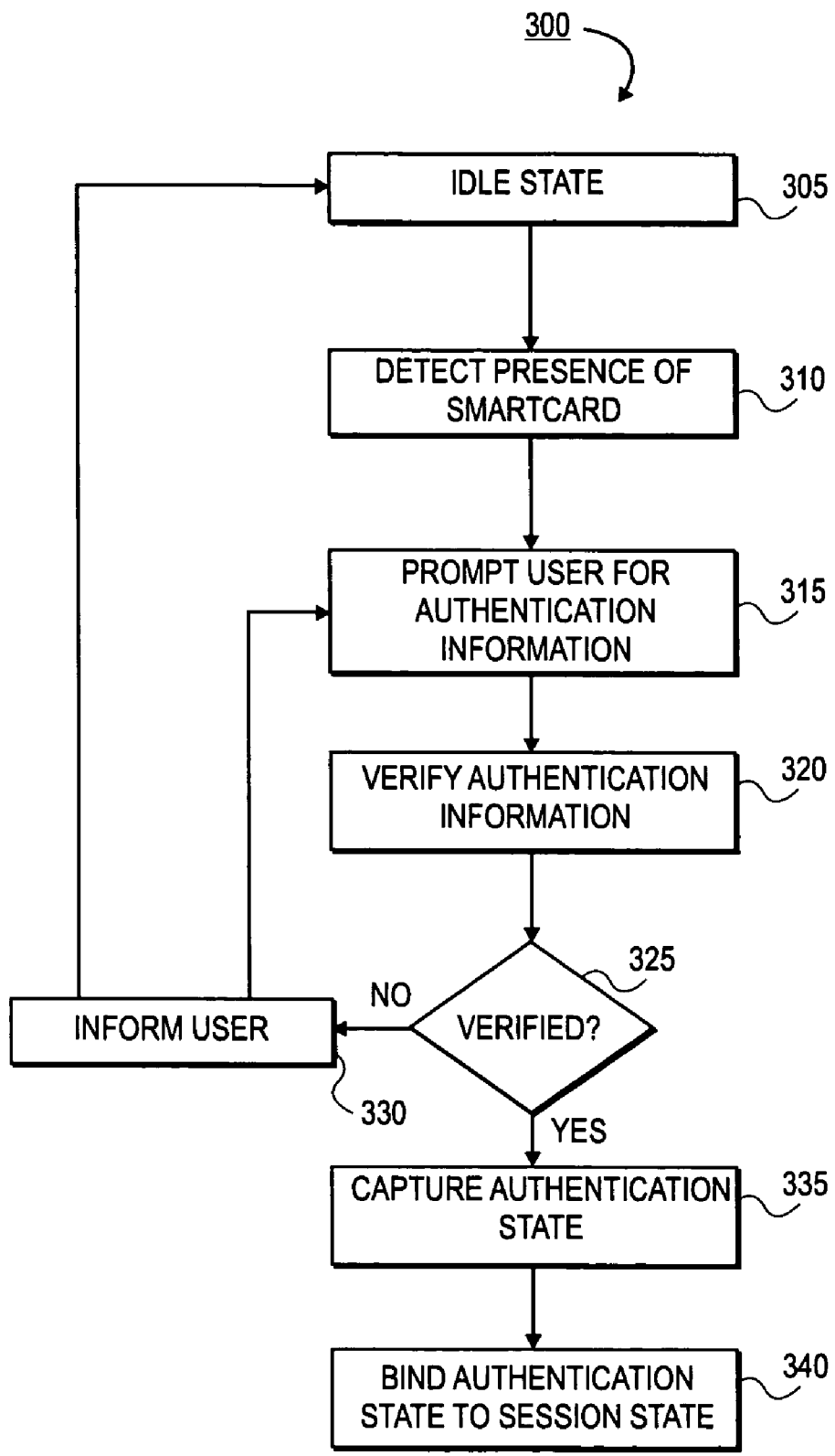
FIG. 3 illustrates an exemplary flow diagram in accordance with yet another embodiment.

FIG. 3 illustrate a flow diagram 300 executed by the security daemon 125 in accordance with another embodiment. It should be readily apparent to those of ordinary skill in the art that the flow diagram 300 depicted in FIG. 3 represents a generalized illustration and that other steps may be added or existing steps may be removed or modified.

As shown in FIG. 3, the security daemon 125 may be configured to be in an idle state, in step 305. More particularly, the security daemon 125 may have been instantiation as part of the normal boot sequence. In some embodiments, the security daemon 125 may be instantiated by a system administrator or in response to an event such as the insertion of a security token in the security device 120.

In step 310, the security daemon 125 may be configured to detect the presence of the security token (i.e., a smart card, PIV smart card, etc.) in the security device 120. The security daemon 125 may then be configured to prompt the user to begin log-on, in step 310. More particularly, the security daemon 125 may prompt the user for authentication information such as personal identification number (PIN), a password or biometric parameter (retinal scan, fingerprint, etc) or enter the same into some trusted patch device. The security daemon 125 may display a dialog box to requesting the user for the authentication information.

In step 320, the security daemon 125 may be configured to pass the user authentication information to the security token for verification or to request that the token read the authentication information from it's trusted path. If the security token fails to verify, the authentication information, in step 325, the security daemon 125 may be configured to inform the user of the verification failure. In some embodiments, the security daemon 125 may prompt the user to re-enter the authentication information in step 315. Alternatively, the security daemon 125 may inform the user that verification failed and return to the idle state of step 305. Alternatively, the security token may detect too many failed attempts to authenticate and the security daemon 125 may be configured to inform the user that the security token is locked.

Otherwise, if the authentication information is verified, in step 325, the security daemon 125 may be configured to capture and hold the authentication state of the inserted security token, in step 335. More specifically, this may be done by holding a PKCS #11 session open and attaching the security token with which the security daemon 125 could perform additional requests against the security token. The security daemon 125 may then represent itself as the authenticated security token to other applications through a PKCS #11 interface. In other words, the security daemon 125 appears to the rest of the processes in the session that the security token is inserted.

In step 340, the security daemon 125 may be configured to bind the authentication state with the current session state of the user. More particularly, in the situation where an application requests requests an initial authentication of the smart card. The application may initially authenticate to the security daemon 125 with some user session mechanism (usually something initialized at login) that does not involve user action (i.e., application authentication). The security daemon 125 would present that authentication information on behalf of the user for that application. Typical implementations of application authentication would include passing magic cookies, environment variables, file descriptors, shared memory segments, etc. to child processes of the parent session, using OS access controls, etc. If an application is part of the session, the security daemon 125 may be configured to implement the steps of FIG. 3 or could choose to only allow a single user session to be logged in.

Figure 4:
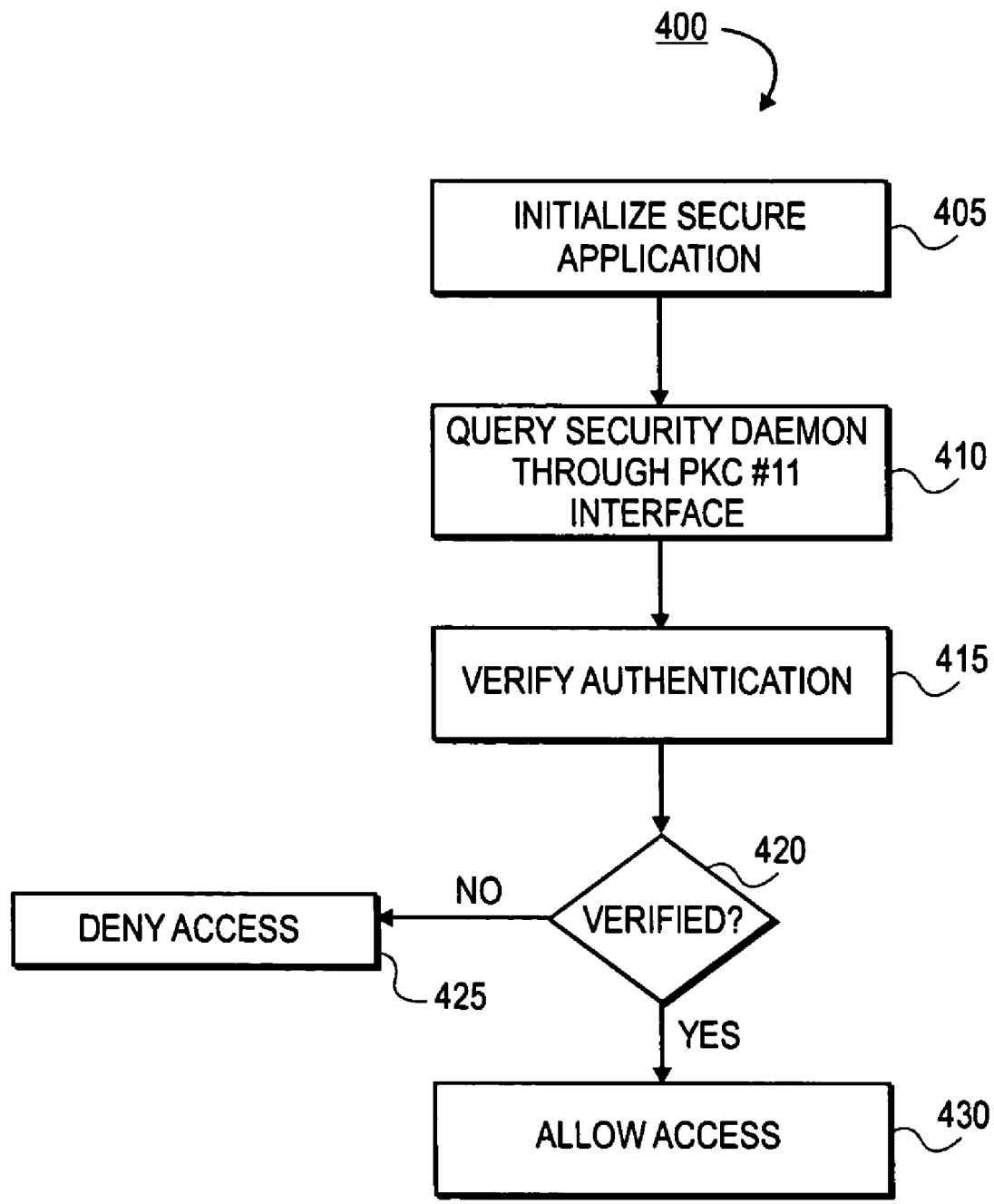
FIG. 4 illustrates another exemplary flow diagram executed by the computing machine in accordance with yet another embodiment.

FIG. 4 depicts a flow diagram 400 executed by secure applications 210 in accordance with yet another embodiment. It should be readily obvious to one of ordinary skill in the art that existing steps may be modified and/or deleted and other steps added in FIG. 4.

As shown in FIG. 4, a user may initiate a secure application 210, in step 405. More specifically, once the user has logged into a session, the user may click on an icon that represents the secure application 210. Alternatively, a command line prompt or menu selection may be used to invoke the secure application 210.

In step 410, as part of the instantiation of the secure application 210, the secure application 210 may be configured to query the security device 120 to determine whether the user has privileges to execute the secure application 210. Typically, secure applications 210 execute a call to the PKCS #11 interface. For these embodiments, the PKCS #11 interface may be connected to the security daemon 125.

In step 415, the secured application 210 call to the PKCS #11 interface may be answered by the security daemon 125, which holds the authentication state of the security token. The PKCS #11 interface returns a message that the security token is inserted and begins verification between the secure application 210 and the security daemon 125.

If verification fails, in step 420, the secure application 210 may display a dialog message informing that access to the secure application is denied, in step 425. Otherwise, if verification is successful, in step 420, the secure application 215 continues to instantiate and the user is granted access, in step 430.

Figure 5:
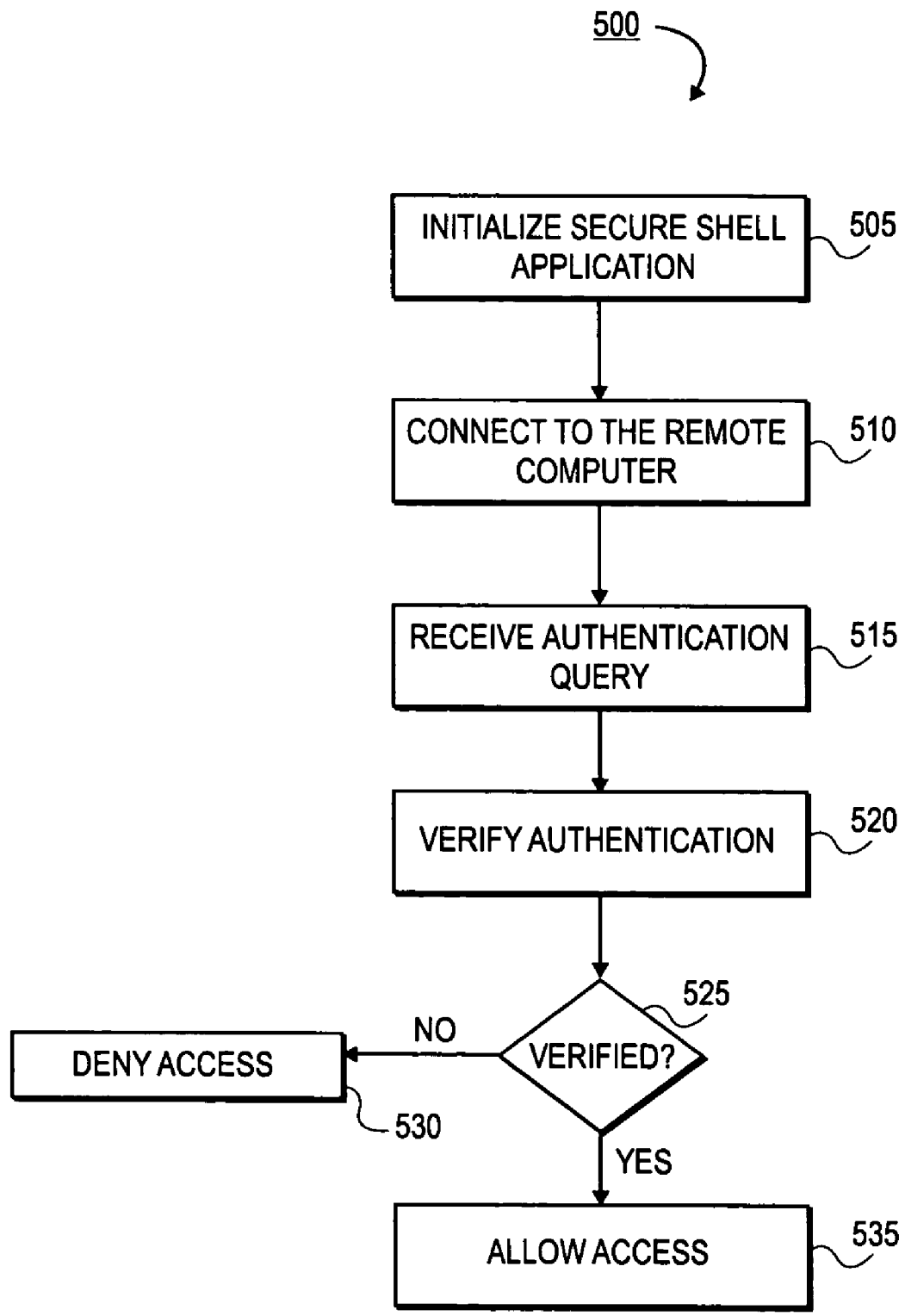
FIG. 5 illustrates yet another exemplary flow diagram in accordance with another embodiment.

FIG. 5 depicts a flow diagram 500 implemented by a client 10 accessing a remote client in accordance with yet another embodiment. It should be readily obvious to one of ordinary skill in the art that existing steps may be modified and/or deleted and other steps added in FIG. 5.

As shown in FIG. 5, a user may initiate a secure shell (ssh) application on a client 110 to access a remote client, in step 505. More specifically, once the user has logged into a session, the user may click on an icon that represents the ssh application. Alternatively, a command line prompt or menu selection may be used to invoke the ssh application.

In step 510, the ssh application may be configured to form a secure connection from the client 110 to the remote client. Once connected to the remote computer, the two clients may begin authentication.

In step 515, the client 110 may receive authentication queries from the remote client over the secure connection. More specifically, the remote client may execute a call to the PKCS #11 interface which is forwarded to the PKCS #11 interface of the security daemon 125 on the client 110.

In step 520, the forwarded call to the PKCS #11 interface may be answered by the security daemon 125, which holds the authentication state of the security token. The PKCS #11 interface returns a message that the security token is inserted to the remote client and begins verification between the remote client and the security daemon 125.

If verification fails, in step 525, the remote client may display a dialog message informing that access is denied, in step 530. Otherwise, if verification is successful, in step 525, the remote client may grant access to the client computer, in step 535.

Figure 6:
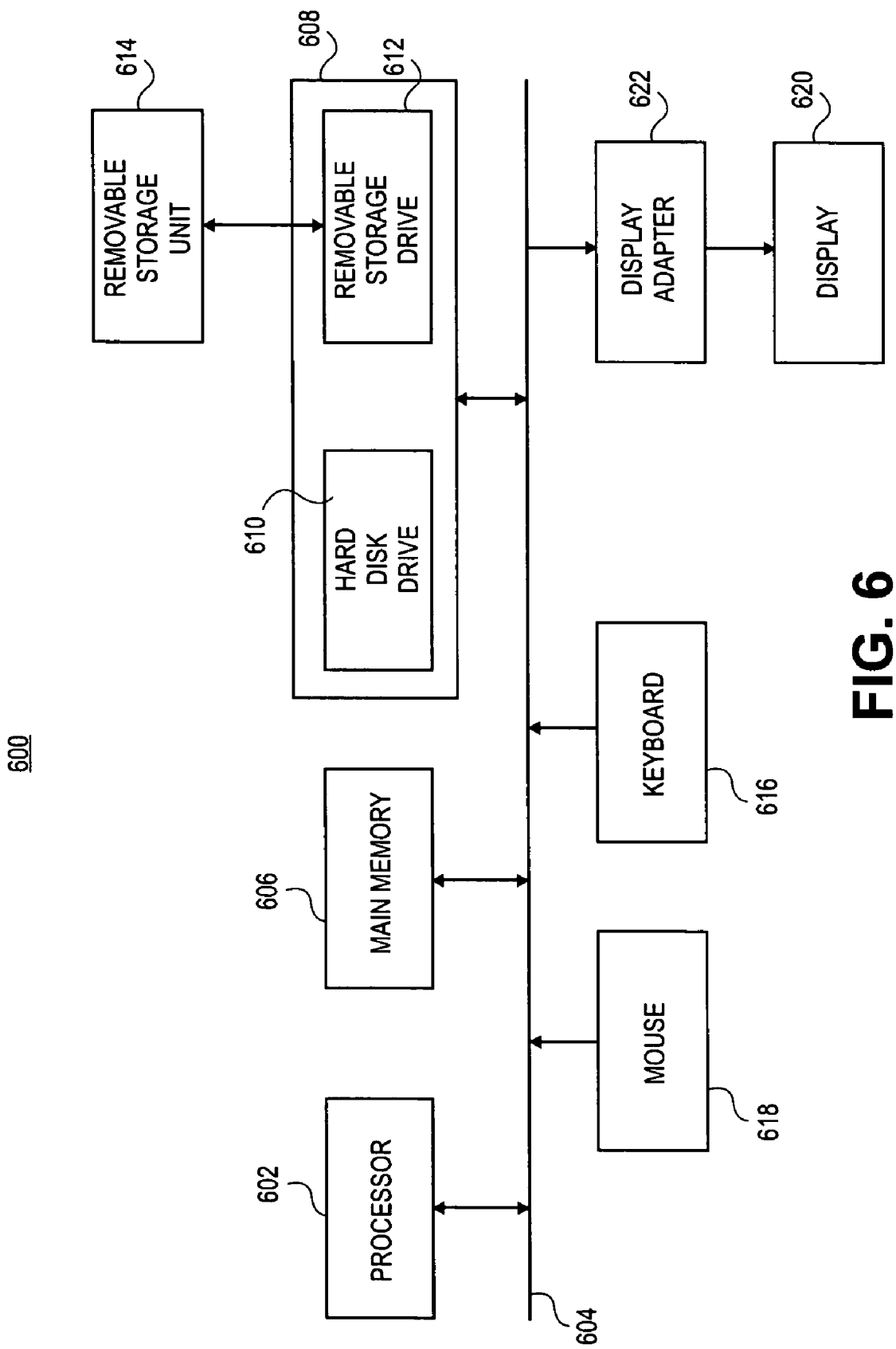
FIG. 6 illustrates an exemplary computing machine.

FIG. 6 illustrates an exemplary block diagram of a computing platform 600 where an embodiment may be practiced. The functions of the security daemon may be implemented in program code and executed by the computing platform 600. The security daemon may be implemented in computer languages such as PASCAL, C, C++, JAVA, etc.

As shown in FIG. 6, the computer system 600 includes one or more processors, such as processor 602 that provide an execution platform for embodiments of the security daemon. Commands and data from the processor 602 are communicated over a communication bus 604. The computer system 600 also includes a main memory 606, such as a Random Access Memory (RAM), where the security daemon may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the security daemon may be stored. The removable storage drive 612 reads from and/or writes to a removable storage unit 614 in a well-known manner. A user interfaces with the security daemon with a keyboard 616, a mouse 618, and a display 620. The display adapter 622 interfaces with the communication bus 604 and the display 620 and receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of secure access, the method comprising:
capturing, by a security daemon in a computer system, an authentication state of a security token in response to a verification of user authentication information;
receiving a request for authentication from at least one application requiring authentication with the security token;
providing, by the security daemon in response to the request, the authentication state to the at least one application requiring authentication with the security token, wherein the security daemon utilizes the authentication state to represent the security token in authentication requests; and
allowing access to the at least one application.

2. The method of claim 1, further comprising:
prompting, using the computer system, for user authentication information in response to the insertion of the security token into the computer system;
receiving the user authentication information; and
verifying the user authentication information.

3. The method of claim 1, further comprising:
using a PKCS #11 interface to allow the at least one application to access the authentication state.

4. The method of claim 1, further comprising:
connecting with a remote secure computer from the computer system;
providing the authentication state to access the remote computer; and
accessing at least one remote application on the remote computer in response to the remote computer authenticating with the authentication state.

5. The method of claim 1, wherein the security token is a token which does not contain separate authentication states for processes.

6. The method of claim 5, further comprising locking the authentication state of the token with a session state.

7. The method of claim 5, wherein the security token is a personal identity verification (PIV) token.

8. The method of claim 1, wherein the security token is shared among multiple users.

9. The method of claim 8, further comprising:
creating a respective session state for each user;
creating an associated authentication state for each respective session state based on the security token; and
binding the associated authentication state with each respective session.

10. An apparatus comprising:
a memory containing instructions; and
a processor, communicatively connected to the memory, that executes the instructions to perform the method of claim 1.

11. A non-transitory computer readable medium comprising executable code for performing the method of claim 1.

12. A system for secure access, comprising:
a computing machine configured to access a multi user multi-machine system;
a security device interface with the computing machine, the security device interface configured to accept a security token for accessing the computing machine; and
a security daemon configured to be executing on the computing machine, wherein the security daemon is configured to:
initiate a session and capture an authentication state of the security token in response to a verification of user inputted authentication information;
bind the authentication state to the session;
receive a request for authentication from an application requiring authentication with the security token, wherein the security daemon utilizes the authentication state to represent the security token in authentication requests; and
provide the authentication state to the application requiring authentication with the security token.

13. The system of claim 12, wherein the security daemon is further configured to provide the authentication state to requesting applications requesting authorization.

14. The system of claim 12, wherein the security daemon is further configured to prompt a user for the authentication information in response to detecting a presence of the security token in the security device.

15. The system of claim 12, wherein the security daemon is further configured to verify received authentication information.

16. The system of claim 13, wherein the security daemon is further configured to store the authentication state of the security token in response to the verification of the authentication information.

17. The system of claim 12,
wherein the computing machine is configured to access a remote computing machine using a secure shell protocol connection.

18. The system of claim 17, wherein the remote computing machine is configured to forward queries for authentication through a local port created by the secure shell protocol.

19. The system of claim 18, wherein the security daemon is configured to present the authentication state to respond to the queries for authentication.

20. The system of claim 19, wherein the remote computing machine is configured to make available resources to the computing machine as though the security token is authenticated at the remote computing machine.

21. The system of claim 12, wherein the security daemon is configured to interface with applications and process with a PKCS #11 compliant interface.

22. A method of sharing a security token among a plurality of users, each user assigned respective initial authentication information that in combination with the security token identifies each user, the method comprising:
creating a respective session state for each user;
creating, by a security daemon a computer system, an associated authentication state for each respective session state in response to verification of the respective initial authentication information with the security token; and
binding, by the security daemon, the respective session state for each user with the associated authentication state to provide access to secure applications,
wherein the security daemon utilizes the associated authentication state to represent the security token to provide access to secure applications cleared for access for the respective user.

\* \* \* \* \*